(No Model.)
A. G. W. RANKIN.
DOMESTIC WATER DISTILLING APPARATUS.
No. 346,221. Patented July 27, 1886.
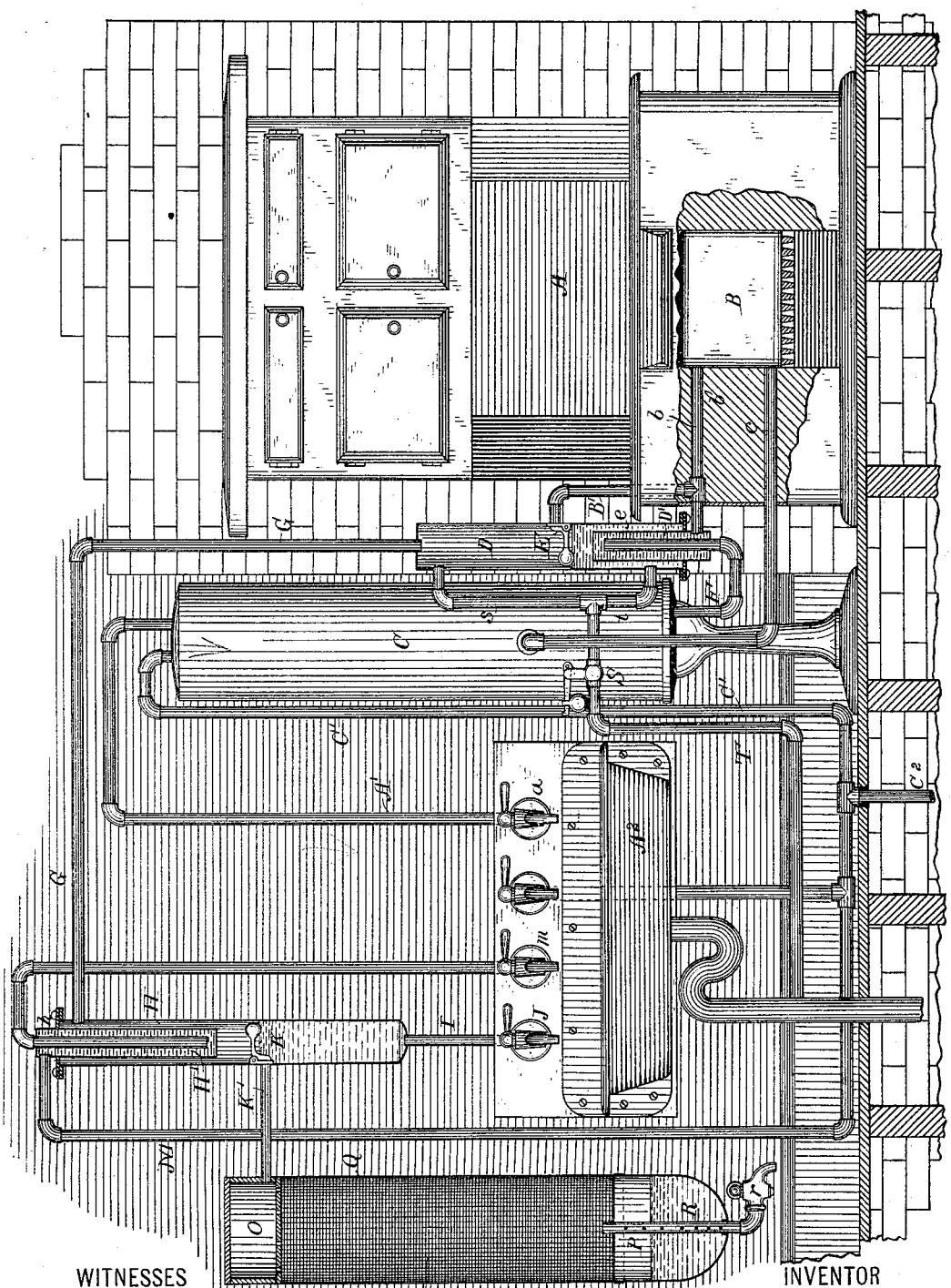
WITNESSES
INVENTOR

United States Patent Office.

ABRAM G. W. RANKIN, OF JERSEY CITY, NEW JERSEY, ASSIGNOR TO CALVIN GODDARD, OF NEW YORK, N. Y.

DOMESTIC WATER-DISTILLING APPARATUS.

SPECIFICATION forming part of Letters Patent No. 346,221, dated July 27, 1886.

Application filed July 24, 1885. Serial No. 172,553. (No model.)

*To all whom it may concern:*

Be it known that I, ABRAM G. W. RANKIN, of Jersey City, in the county of Hudson and State of New Jersey, have invented certain new and useful Improvements in Apparatus for Distilling Water, of which the following is a specification.

My invention relates to improvements in apparatus of the class employed for purifying water by distillation for household use.

My object, mainly, is to provide apparatus designed for use in connection with an ordinary range, which shall be of simple construction and adapted to evaporate water, carry off the vapor generated, condense it, and aerate the water of condensation, to most perfectly prepare it for drinking and culinary purposes.

The accompanying drawing shows, partly in elevation and partly in section, a preferred organization of apparatus for carrying out my invention, some of the essential features of which may be employed without other parts, or in connection with modifications thereof.

As in this instance shown, the range A, with the heater or water-back B and boiler C, is of well-known construction; but in lieu of the ordinarily-employed water-back there may be used a coil of pipe in obvious way for heating the water. The boiler C is supplied with water by the usual connecting-pipe, C', from the supply-pipe C², and the water passes from the boiler by the pipe c to the heater B, and from the heater by way of a return-pipe, b, during the circulation of the water. The hot-water pipe A' passes from the boiler, and is provided with the ordinary cock, a, over the sink A². The return-pipe b has connection with an evaporating apparatus consisting of a two-part tank or duplex cylinder, D D'. The outer end of the return-pipe connects with the inner or heating tank, D', near its lower end, and another connection of this return-pipe with the tank is by way of a branch pipe, B', which extends upwardly and terminates at its upper end in the outer or vapor-generating tank, D, above the level of the inner tank. An automatic or float valve, E, of well-known construction, is provided, so as to shut off communication between the outer tank and the branch pipe when water has accumulated in this tank to the desired level. Both the inner and outer tanks are closed or imperforate, as will readily be understood. The diameter of the inner tank is sufficiently less than that of the outer tank to provide a water-jacket or annular space between the tanks, as shown. The outer tank is constructed with a removable lower end or head secured in place by flanges and screws and a packing, so that access to the tank may be had when desired to clean or repair it. The narrow annular space e between the inner and outer cylinders and the space above the crown of the inner cylinder to the level at which the water is maintained by the automatic valve are supplied with water and vapor from the heater by way of the return-pipe and its branch pipe, and the inner cylinder, D', is kept filled with hot water, or commingled water and vapor, by way of the return-pipe, thus serving to heat the water in the outer cylinder, as will readily be understood. The water in its circulation passes from the inner tank by way of the pipe F, the upper open end of which reaches nearly to the crown of the inner cylinder. The hot water passes by way of this pipe to the boiler C, as will be made plain by reference to the drawing. A vapor-conveying pipe, G, passes from the upper end of the outer cylinder, D, at a point above the predetermined level of the water therein, to a condensing-tank, H. This condensing-tank is of duplex form, being constructed with an inner or cooling tank, H', extending into the outer or condensed-water tank, H, from its upper end. The outer tank of this duplex condensing-cylinder is provided with a removable head, h, suitably packed and secured in place, for obvious purpose. The vapor-conveying pipe G communicates with the outer tank of the condensing-cylinder near its top. A waste-pipe, I, connected at its upper end with the lower end of the outer condensing-tank, leads to the sink, and is provided with an ordinary waste-cock, J, in order that surplus water may be drawn off from the condensing-tank. An automatically-actuated or float valve, K, is provided in the outer condensing-tank below the lower end of the inner or cooling tank, and serves to let off the water of condensation when this valve is opened, by way of a pipe, K', to a receiving-tank, L, the details of construction of which will further on be described. Cold water is admitted by way of a supply-pipe, M, to the cooling-tank H'. This pipe communicates with the upper end of the inner or cooling tank, and a draw-off pipe, passing at its upper end down into this tank, is provided at its lower end with a waste-cock, m, over the sink. The receiving-tank L, supplied with the condensed water by way of the pipe K', serves to hold the collected water of condensation passing from the condensed-water cylinder, and this receiving-tank is so constructed that the condensed water before being drawn off from it is thoroughly aerated. As in this instance shown, this receiving-tank is constructed as follows: At its upper end there is provided a chamber, O, perforated at its bottom. The pipe K' enters this chamber, the water passing through the perforated bottom of the chamber downward to the collecting-chamber P at the bottom of the tank. The open space between the upper and lower chambers of this tank is provided with a reticulated protecting-cylinder, Q, preferably formed of wire-gauze. In this way free access of air is admitted to the water as it trickles downward from the upper to the lower chamber of the tank, while insects and dirt are kept from the water.

To still further insure a thorough impregnation of the water with air, the pipe R, by way of which the water as needed is drawn off by the cock r, is perforated and extended above the level of the water in the collecting-chamber. It will be seen that as the water enters the perforations of the pipe air is supplied, being drawn in by suction. It is of course not absolutely necessary that the perforated bottom be provided to the upper chamber of the receiving-tank; but its employment is preferable, in order to insure the separation of the stream of water into a number of smaller streams, to facilitate access of air to the water; and, if preferred, instead of providing separate upper and lower chambers, the receiving-tank may be formed of a metallic cylinder perforated between its upper and lower ends, leaving a sufficiently large imperforate portion at its bottom to hold the collected water.

To guard against injury of the apparatus by explosion, a safety-valve, S, is provided in connection with a blow-off pipe, T. This blow-off pipe is connected by means of branches s t with the outer tank, D, of the duplex evaporating-tank. These branch pipes connect with this outer tank near the bottom and upper ends thereof.

The operation of the safety-valve is obvious. From the above description it will be seen that vapor is carried to the condensing apparatus and there condensed, the cold water supplied to the inner tank of the condensing apparatus keeping the temperature at a sufficiently low point to insure rapid condensation of the vapor; that the purified water passes from the condensing apparatus to the receiving and aerating apparatus, ready for use as drawn therefrom, and that by means of the safety-valve provision is made for carrying off and discharging accumulated dirt or sediment, the blow-off pipe having connection with the sewer, as will readily be understood.

It will be obvious that by my improvements automatically-operating distilling apparatus is provided which is of simple construction, and readily adapted for use in connection with the ordinary kitchen range or stove and water-service of a house.

I claim as of my own invention—

1. The combination of the condensing apparatus and the receiving-tank having pipe-connection with the condensing apparatus and provided with the bottom chamber, the outlet-pipe and cock, and the reticulated protecting-cylinder O above the bottom chamber, substantially as and for the purpose set forth.

2. In a distilling apparatus, the combination of the tank consisting of two cylinders, the one a heating-cylinder and the other supplied with water to be evaporated, and the second tank, consisting also of two cylinders, one receiving vapor from the evaporating-tank by a pipe connected therewith, and extending from above the level of the water in the evaporating-cylinder, and the other supplied by a pipe with the cooling medium, and having the outlet for such medium, substantially as and for the purpose set forth.

3. The combination of the range, provided with water-back, boiler, and pipes b B' F c, and a distilling apparatus consisting of the vapor-generator composed of tanks D and D', one forming a jacket for the other, the latter being supplied with a current of water from the water-back entering through pipe b and issuing through pipe F, and the former being supplied with water from the same source through pipes b B', and provided with an automatic valve, E, for regulating the height of water therein, the condenser composed of two cylinders, H and H', one forming a jacket for the other, the pipe G, by which the cylinder H is supplied with vapor from the generator, and outlet-pipe K' for the distilled water, and the supply and draw-off pipes for the cylinder H', so combined with the water-service of the house that a stream of water may be caused to flow from the general service-supply through said chamber, substantially as and for the purpose set forth.

4. In a distilling apparatus, a vapor-generating duplex tank consisting of two cylinders, one having an inlet for the introduction of heated water, and an outlet for the same, the one located near and the other some distance above the bottom of said cylinder, and the second cylinder having an inlet for water and an outlet for vapor to be generated from said water, leading from a point above the predetermined level of the water therein to a condenser, substantially as and for the purpose set forth.

5. In a distilling apparatus, a vapor-generator consisting of two cylinders, one supplied with a heating medium and the other supplied with water to be heated, and provided with a pipe leading from a point above the predetermined level of the water therein, one of which surrounds and forms a jacket for the other, substantially as and for the purpose set forth.

6. In a distilling apparatus, a vapor-generator consisting of two cylinders, one supplied with a heating medium and the other supplied with water to be heated, and provided with a pipe leading from a point above the predetermined level of the water therein, one of which surrounds and forms a jacket for the other, the said heating-cylinder having an inlet at or near the bottom thereof, and an outlet at or near the top thereof, whereby a continuous circulation of the heating medium therein is accomplished, substantially as and for the purpose set forth.

7. The combination of the water-back of a range and the vapor-generator of a distilling apparatus, the heating medium of which consists of a stream of hot water flowing from said water-back to or through said vapor-generator, substantially as and for the purpose set forth.

8. In a distilling apparatus, a vapor-generator composed of two regular cylinders, one partially inclosed within the other, and provided with inlets and outlets, as described, whereby heated water may be caused to flow through one of said cylinders, and the other may be supplied with water to be converted into vapor, and said vapor conducted therefrom by a pipe leading from a point above the predetermined level of the water therein to the condenser, substantially as and for the purpose set forth.

9. In a distilling apparatus, the combination, with the water-back of a range, of a vapor-generator, into the vapor-cylinder of which water is led from said water-back, said cylinder being provided with an automatic valve to regulate the height of the water therein, substantially as and for the purpose set forth.

10. In a distilling apparatus, the combination, with the vapor-generating chamber, of a branch pipe connected thereto, both above and below the water-level, and provided at a point below said water-level with a safety-valve, and a pipe leading therefrom to the sewer-pipe, all as and for the purpose set forth.

11. In a distilling apparatus, the combination, with the condensing-cylinder thereof, of an aerating apparatus connected therewith by a pipe leading from said condensing-chamber, the entrance to said pipe being governed by an automatic float-valve within the said condensing-cylinder, the said aerating apparatus consisting of the upper chamber with perforated bottom, a collecting-chamber located below a perforated screen inclosing the intervening space, and the pipe R, provided with a cock and extending upward to a point above the level of the water in the collecting-chamber, and having its sides perforated, all as and for the purpose described.

In testimony whereof I have hereunto subscribed my name.

ABRAM G. W. RANKIN.

Witnesses:
 W. L. CANDEE,
 C. GODDARD.